United States Patent [19]

Lange

[11] 4,184,882

[45] Jan. 22, 1980

[54] SILICON NITRIDE-SILICON CARBIDE COMPOSITE MATERIAL

[75] Inventor: Frederick F. Lange, Murrysville, Pa.

[73] Assignee: Westinghouse Electric Corp., Pittsburgh, Pa.

[21] Appl. No.: 860,403

[22] Filed: Dec. 13, 1977

Related U.S. Application Data

[63] Continuation of Ser. No. 670,582, Mar. 25, 1976, abandoned, which is a continuation-in-part of Ser. No. 499,941, Aug. 23, 1974, abandoned, which is a continuation-in-part of Ser. No. 351,744, Apr. 16, 1973, abandoned.

[51] Int. Cl.$^2$ .............................................. C04B 35/56
[52] U.S. Cl. ..................................... 106/44; 106/73.5
[58] Field of Search .................................. 106/44, 73.5

[56] References Cited

U.S. PATENT DOCUMENTS 3,833,389   9/1974   Komeya et al. ...................... 106/44

*Primary Examiner*—James Poer
*Attorney, Agent, or Firm*—R. A. Stoltz

[57] ABSTRACT

A densified silicon nitride-silicon carbide composite material formed by hot-pressing a mixture of silicon nitride ($Si_3N_4$) powder, which forms the matrix, up to 40 volume percent and preferably from 5-30 volume percent silicon carbide (SiC) powder, and a densification aid such as magnesium oxide (MgO). The average size of the silicon carbide particles is to be less than about 5 microns. The densified composite material is characterized by higher thermal conductivity and strength at high temperatures relative to silicon nitride. The flexural strength at 1400° C. of the composite material being at least double that of sintered silicon nitride.

5 Claims, 1 Drawing Figure

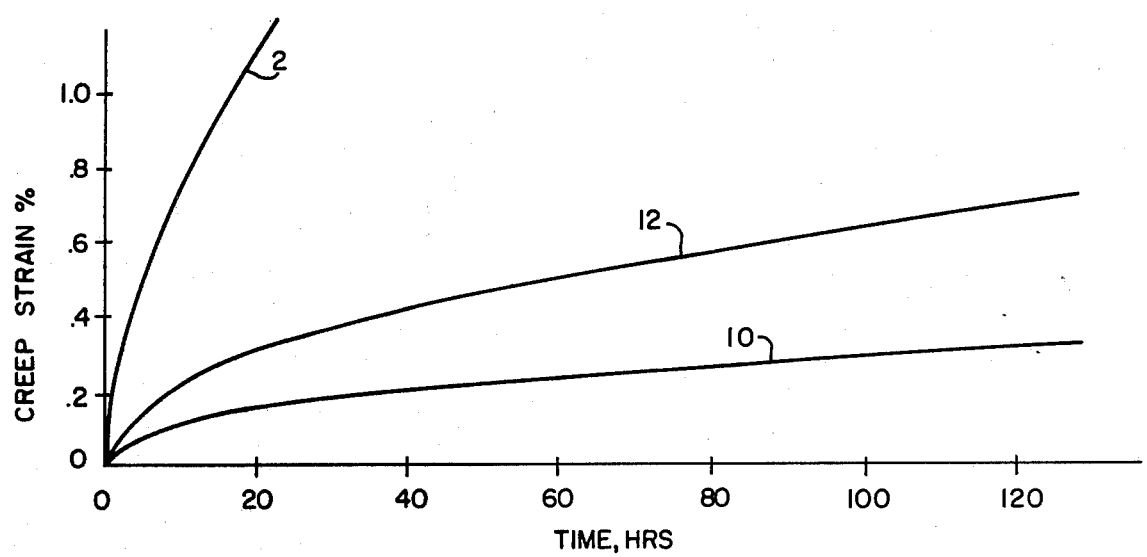

SILICON NITRIDE-SILICON CARBIDE COMPOSITE MATERIAL

This invention was made during the performance of work under U.S. Government Contract N00014-68-C-0323.

CROSS-REFERENCE TO RELATED APPLICATIONS

This application is a continuation of application Ser. No. 670,582, filed Mar. 25, 1976, which in turn was a continuation-in-part of application Ser. No. 499,941, filed Aug. 23, 1974, which in turn was a continuation-in-part of application Ser. No. 351,744, filed Apr. 16, 1973, all now abandoned.

BACKGROUND OF THE INVENTION

1. Field of the Invention

This invention relates generally to composite materials formed from powder, and more particularly to silicon nitride-silicon carbide composite materials formed from powder and which exhibit excellent strength as well as high density and thermal conductivity.

2. Description of the Prior Art

Both silicon carbide (SiC) and silicon nitride ($Si_3N_4$) are ceramic materials which have been seriously considered and tested for gas-turbine engine components because of their ability to withstand thermal shock conditions inherent to gas-turbine operations. Each of these materials possesses certain advantages over the other. For example, silicon nitride has lower thermal expansion and higher fracture toughness than silicon carbide. However, silicon carbide has a higher thermal conductivity than silicon nitride which is a very desirable feature for the components of gas-turbine engines. Thus, in selecting the material between silicon carbide and silicon nitride the selection of either material necessitated sacrificing the advantages of the other material in certain areas.

The density of silicon nitride and to a certain extent the strength of the composite material in which silicon nitride is the matrix component is dependent upon the manner in which the same is produced. N. G. Parr et al in "The Technology and Engineering Applications of Reaction-Bonded SILICON NITRIDE" J.R.N.S.S. Vol. 22, No. 3, pages 133-141 describes the reaction-bonding (sintering) of silicon nitride and reports at page 137 both the density and porosity which indicates the highest density they attained is only about 85 percent of the theoretical. This same paper deals with the effect of density and strength and indicates higher densities exhibit better strengths. Since better strengths are obtained where the silicon nitride approaches theoretical density and since silicon carbide is inherently weaker than silicon nitride, the improved thermal conductivity associated with the silicon carbide component also acts to diminish the strength of the composite material. Consequently, it is incumbent to obtain the highest density in the matrix material for improved strength.

One manner in which this was attempted was to partially reaction sinter silicon powder in a nitrogen-bearing atmosphere and thereafter raise the temperature in such a manner as not to form a molten pool of silicon metal and then the balance of the unreacted silicon was converted to silicon dioxide by appropriately changing the atmosphere. This process, as described by Parr in U.S. Pat. No. 3,215,547 was effective for improving the strength although no data are set forth for comparative purposes. Parr also disclosed a ternary composition of silicon nitride, silicon dioxide and up to 10 percent silicon carbide. This latter component is described as improving the creep strength of the composite material. In contrast, the function of the silicon carbide in the present invention is to improve the thermal conductivity. Concurrently therewith, slight decreases in room temperature flexural strength and creep strength exhibited by the composite material are noted in comparison with a composition comprising substantially all silicon nitride. These competing factors must be balanced in the composition of the present invention.

SUMMARY OF THE INVENTION

According to the present invention, a composite material formed of silicon carbide particles in a silicon nitride matrix is provided which composite material maintains the low thermal expansion and high fracture toughness of the silicon nitride and yet increases significantly its thermal conductivity. Also, unexpectedly, the composite material has a much higher, high temperature (1300° C.–1400° C.) flexural stength than silicon nitride.

BRIEF DESCRIPTION OF THE DRAWING

The FIGURE is a graph illustrating the creep rates of silicon nitride and of the composite material of this invention along with a composite material having a high calcium content.

DESCRIPTION OF THE PREFERRED EMBODIMENT

According to the present invention, a silicon nitride-silicon carbide composite is provided which is formed by hot-pressing mixed powders of silicon nitride ($Si_3N_4$) and silicon carbide (SiC) preferably in the presence of a densification aid, such as magnesium oxide (MgO), to form a composite silicon nitride and silicon carbide material. The silicon carbide should not exceed about 40 volume percent, and the average size of the silicon carbide particles should not exceed about 5 microns.

Several different samples of the composite material comprising mixed silicon nitride and silicon carbide powders were formed to the desired shape with varying percentages of each material and varying sizes of the silicon carbide particles according to standard techniques. The silicon nitride powder was a commercially purchased powder which had about 0.93 volume fraction of alpha-phase silicon nitride and about 0.07 volume fraction of beta-phase silicon nitride. The powder was prepared by first milling 104.5 grams of the powder with 5.5 grams of magnesium oxide (MgO) and with about 1300 grams of ¼ inch diameter tungsten carbide mill balls and about 100 cc of t-butanol milling fluid.

An effective amount of MgO which may be used for enhancing densification is between about 1–10 percent by weight and, preferably, between about 1–6 percent by weight. While MgO is the preferred densification aid employed in my invention, others also may be used in place of MgO. Oxides such as yttrium oxide ($Y_2O_3$); cerium ($CeO_2$); and the other rare earth oxides are suitable densification aids. In addition, lithium oxide ($LyO_2$) and aluminum oxide ($Al_2O_3$) are, likewise, suitable. Effective amounts of these additional densification aids are about 3–20 percent by weight of the rare earth oxides; about 1–10 percent by weight $LyO_2$; and about 10–50 percent by weight $Al_2O_3$.

The mixture of Si₃N₄ and MgO powders was milled for about fifteen hours at which period the pre-selected volume fractions of the silicon carbide powders were added along with 200 cc more of the t-butanol milling fluid. This composite powder was then milled for one more hour and then dried. Different composite powders were formed for each different volume percent of SiC and for the different size particles of the SiC according to this technique.

The various composite powders were then hot-pressed to form the samples. Approximately 100 grams of the milled powder (silicon nitride, silicon carbide and magnesium oxide) was formed into a two-inch diameter pellet by pressing the powder in a steel die. The pellet was then inserted in a two-inch diameter cylindrical graphite die which was precoated with a BN slurry to prevent reaction of the powder with the graphite. End plungers were fixed into the die and the die and die plunger assembly were placed in a hot-press with a nitrogen gas atmosphere. The hot-press was brought to 1600° C. within about forty minutes with 1000 psi applied to the end plungers at room temperature. Within the next twenty minutes the temperature was raised to about 1750° C. Between the 1600° C. and 1750° C. temperatures an additional 1000 psi was applied for every 50° C. for a total of 4000 psi. A temperature of 1750° C. and pressure of 4000 psi were held for a period of two hours at which time the furnace was turned off and the pressure released. The specimens were allowed to cool.

The incremental pressure sequencing steps of the hot-pressing operation may be varied somewhat from the above described preferred process embodiment. The entire load of 4000 psi may be applied to the end plungers in the hot-press at room temperature, then the temperature is brought up to 1750° C. and held at temperature for two hours. The furnace is then turned off, the pressure is released and the densified composite article is permitted to cool. This method, while simplifying the process, does however tend to increase die wall friction compared to the earlier described, stepped, pressure increase technique. In the incremental pressure method, die wall friction may be further reduced by relieving the applied pressure on the end plungers about 10–15 percent about every 15 minutes while traversing the 1000–4000 psi range.

Various tests measuring the flexural strength at room temperatures, the flexural strength at elevated temperatures, and the thermal conductivity were performed on a control specimen of a silicon nitride material and on the various specimens with different percentages and sizes of silicon carbide particles in a silicon nitride matrix formed according to this technique. The results of these tests are given in the table below.

TABLE

| Composition | | Flexural Strength (Rm. temp.) K psi | Flexural Strength at 1400° C. K psi | Flexural Strength at 1300° C. K psi | Thermal Conductivity Watts/cm° K | Density g/cm³ |
|---|---|---|---|---|---|---|
| Material | Volume Percent SiC | | | | | |
| Matrix Si₃N₄ | 0 | 94.9 | 17.4(3) | 27.2(4) | .39 | 3.20(99.5)* |
| 5um SiC(1) | 10 | 83.8 | 35.7(2) | | .44 | 3.21(99.3) |
| | 20 | 86.1 | 39.7(3) | 55.2(2) | .49 | 3.20(99.5) |
| Matrix Si₃N₄ | 30 | 84.7 | 34.4(2) | | .54 | 3.15(97.7) |
| | 40 | 56.6 | | | | 2.81(87.1) |
| 9um SiC(1) | 10 | 75.5 | 30.0(2) | | | 3.21(99.5) |
| | 20 | 70.0 | 30.4(2) | | | 3.21(99.5) |
| Matrix Si₃N₄ | 30 | 57.1 | 28.2(2) | | | 3.21(99.4) |
| | 40 | 43.1 | | | | 3.06(95.2) |
| 32um SiC(1) | 5 | 59.0 | | | | 3.20(99.3) |
| | 10 | 56.6 | | | .46 | 3.21(99.6) |
| Matrix Si₃N₄ | 20 | 48.6 | | | .55 | 3.21(99.7) |
| | 30 | 45.4 | | | .57 | 3.22(99.9) |
| | 40 | 35.9 | | | | 3.17(98.5) |

(1)average particle size as measured with a particle size analyzer
(2)average of two specimens
(3)average of four specimens
(4)one specimen; fabricated with 1 weight percent MgO
*Values in parentheses are percent theoretical densities based upon volume fraction considerations.

As can be seen from the test results shown in the table above, when the silicon carbide particles are of the order of magnitude of 5 μm there is very little decrease in the room temperature flexural strength of the composite material over that of the silicon nitride matrix, especially when the volume fraction of the silicon carbide is 30 or less. As can be seen this decrease is of the order of magnitude of 10 or 11 percent in this range which is minimal. Further, while the difference in strength is statistically significant, nevertheless in other tests the silicon nitride matrix has shown a room temperature flexural strength of the order of magnitude of about 85 K psi, thus indicating that the control specimen for this particular experiment may have exhibited a strength which is an aberration and one which would not normally be expected under similar reproducible conditions. In any event, even the indicated drop in room temperature flexural strength is not extreme and it can be stated that the room temperature flexural strength of the composite material in the 5 μm range of particles is almost as good as the flexural strength of the silicon nitride material itself.

However, more significantly, as can be seen from the table, the high temperature flexural strength of the composite material is substantially better than the high temperature flexural strength of the silicon nitride material alone. In fact, the 5 μm silicon carbide powder size range, the flexural strength is virtually doubled at both 1300° C. and 1400° C. This is extremely significant and highly beneficial in material being utilized for structural components of gas-turbines.

Also, as can be seen from the table, the addition of silicon carbide to the silicon nitride matrix substantially increases the thermal conductivity of the composite material, it being observed that for each 10 percent volume fraction of silicon carbide there is an approximate increase of about 0.05 watts/cm°K. This is extremely significant and is very beneficial in turbine components as was indicated above where it was pointed out that one of the benefits of silicon carbide over silicon nitride was its much higher thermal conductivity. Thus, by adding a silicon carbide phase to a silicon nitride matrix, the thermal conductivity can be increased, the high temperature flexural strength can be doubled with only moderate decrease in room temperature flexural strength, if at all, when the size of the silicon carbide particles are small, in the range of 5 $\mu$m or less.

The test results set forth in the table also show both room temperature and high temperature flexural strength are significantly and substantially lower when the particle size of the silicon carbide is greater than 5 $\mu$m. Also, even with 5 $\mu$m particle size of SiC, where there is more than 30 percent volume fraction of the SiC, the room temperature flexural strength is adversely affected unless the density of the fabricated material exceeds about 3.1 gms/cm$^3$.

While there appears to be some compromise in the creep strength through the addition of about 15 percent volume fraction silicon carbide to the silicon nitride matrix it is believed that this difference may be explained on the basis of the relative amount of calcium probably present as calcium compounds such as CaO, which is present as an impurity. Referring now to the drawing, curve 10 is a plot of the percent creep strain vs. time for a silicon nitride composition without deliberate additions of silicon carbide and curve 12 is a silicon nitride composition containing about 15 percent silicon carbide having an average particle size of about 5 $\mu$m. It can be seen that there is a close identity in the curves 10 and 12, the material for curve 12 exhibiting a creep rate of about $3 \times 10^{-5}$/hr. and the material for curve 10 exhibiting a steady state creep rate of about $1.4 \times 10^{-5}$/hr. Both materials were tested at 1400° C. with a 15 K psi fiber stress. Aside from the SiC content of the material of curve 12, the only difference between the materials of curve 12 and curve 10 resides in curve 12 having about 160 ppm of calcium whereas the material of curve 10 had about 140 ppm calcium. Curve member 2 represents a silicon nitride composition containing about 20 percent by volume silicon carbide having an average particle size of less than 5 microns but containing more than 1000 ppm calcium. The specimen exhibited extremely poor creep properties when tested at 1300° C. under a fiber stress of 20 K psi, failing in only 26.7 hours. Accordingly, it is preferred to keep the calcium content as low as practical and in no event should it exceed about 200 ppm for structural materials.

Thus, it can be seen that a significantly improved composite material is provided which is a composite of silicon nitride and silicon carbide formed from mixed powders of silicon nitride and silicon carbide wherein there is up to about 40 percent by volume of silicon carbide particles and preferably no more than 30 percent and wherein preferably the silicon carbide particles do not exceed about 5 $\mu$m in size. Also, by the utilization of powders, precise control of the size and other variables of the SiC particles and control of the matrix can be maintained to provide the optimum attainable properties in the final structure which cannot be obtained by other techniques.

What is claimed is:

1. A composite material formed from sintering and densification under pressure of a mixture of silicon nitride ($Si_3N_4$) powder, silicon carbide (SiC) powder and an effective amount of a densification aid, the silicon carbide powder being present in the mixture in an amount less than 40 percent by volume and having an average particle size not exceeding about 5 microns, the mixture containing less than about 200 ppm calcium, the densified composite material characterized by improved high temperature flexural strength and thermal conductivity relative to sintered silicon nitride.

2. The composite material of claim 1 wherein the densification aid is magnesium oxide (MgO), present in an amount between about 1 percent and 10 percent by weight.

3. The composite material of claim 2 containing between about 5 percent and about 30 percent by volume silicon carbide.

4. A hot-pressed, composite material suitable for use as a structural component in gas-turbines consisting essentially of a silicon nitride matrix containing from about 5 percent to about 30 percent by volume of silicon carbide and containing an effective amount of a densification aid, the silicon carbide having an average particle size prior to hot-pressing not in excess of 5 microns and containing less than 200 ppm calcium, the composite material having a density of at least 3.1 grams/cm$^3$ and a thermal conductivity of at least 0.42 watts/cm°K.

5. The composite material of claim 4 wherein the densification aid is magnesium oxide, present in an amount between about 1 percent and 10 percent by weight.

* * * * *